No. 678,526. Patented July 16, 1901.
C. P. STEWART.
APPARATUS FOR THE RECOVERY OF GOLD FROM CYANID SOLUTIONS.
(Application filed Oct. 15, 1900.)
(No Model.)
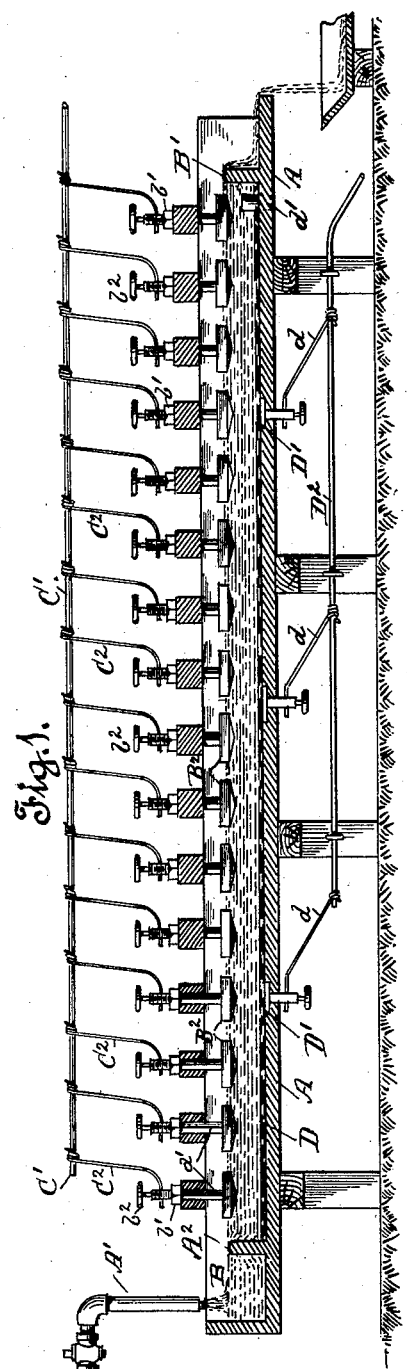
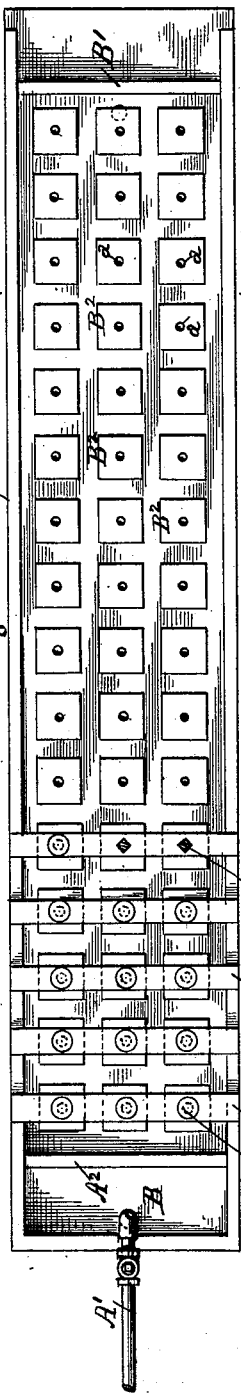
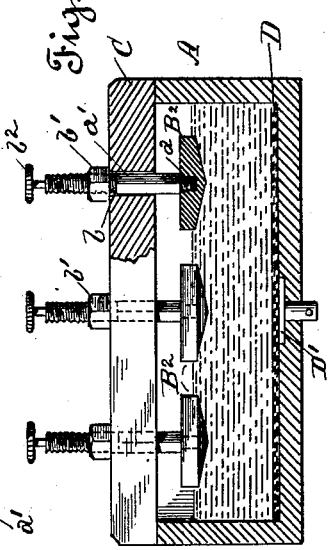
Witnesses.
Inventor.
Charles P. Stewart
by N. A. Acker
his atty.

UNITED STATES PATENT OFFICE.

CHARLES P. STEWART, OF OAKLAND, CALIFORNIA.

APPARATUS FOR THE RECOVERY OF GOLD FROM CYANID SOLUTIONS.

SPECIFICATION forming part of Letters Patent No. 678,526, dated July 16, 1901.

Application filed October 15, 1900. Serial No. 33,089. (No model.)

*To all whom it may concern:*

Be it known that I, CHARLES P. STEWART, a citizen of the United States, residing at Oakland, county of Alameda, and State of California, have invented certain new and useful Improvements in Apparatus for the Recovery of Gold from Cyanid Solutions; and I do hereby declare the following to be a full, clear, and exact description of the same.

The present invention relates to an improved apparatus by means of which the precious metal contained in cyanid solutions is electrolytically precipitated during the flow of the solution, the object of the invention being more particularly designed for the treatment of solutions containing low-grade or refractory ores.

For an understanding of the invention by means of which the precious metals are recovered from the cyanid solution reference should be had to the apparatus illustrated by the accompanying drawings, wherein—

Figure 1 is a longitudinal sectional view of the apparatus. Fig. 2 is a top plan view thereof; and Fig. 3 is a detail cross-sectional view, in end elevation, taken on line $x$ $x$, Fig. 2.

The apparatus consists of a box, trough, or receptacle A, into which the cyanid solution is discharged at one end, preferably by means of the feed-pipe A'. At the end of the box, trough, or receptacle A, receiving the solution, is fixed a transverse partition $A^2$, which forms a compartment B, into which the solution is delivered and retained until it overflows the partition. By means of this partition the solution is distributed evenly throughout the width of the box, trough, or receptacle. At the opposite end of the said receptacle is arranged the transverse overflow-partition B', which serves to retain the solution within the receptacle proper until a given height has been reached, after which the solution overflows and is discharged from the apparatus. By such time, however, the metal held in suspension within the solution will have been precipitated. Consequently the discharged portion may be treated as waste material so far as concerns the metal to be recovered therefrom.

Within the box, trough, or receptacle A is arranged a number of anodes $B^2$, which are secured in rows crosswise of the receptacle and throughout the length thereof, considering that portion between the end partitions as being the working portion of the said receptacle. These anodes are of cast-iron and each is provided with a screw-threaded opening $a$, into which screws the lower screw-threaded end of the copper stem $a'$. By thus making the anode and its stem separable I am enabled to remove the anode in case it becomes damaged or worn out and replace same by a new one. The anodes are held in place by means of the cross-supports C, the stem of the said anodes passing through openings $b$ in the cross-supports and being secured thereto by nut $b'$. By tightening or loosening these nuts the stems $a'$ may be raised or lowered, as desired, in order to regulate the depth of the anodes into the cyanid solution. Connection is made between the anodes and the supply-wires C' by means of the branch wires $C^2$, said branch wires being secured to the stem of the anodes by the screws $b^2$, Figs. 1 and 3.

As the cathode for the apparatus I employ a body D of quicksilver, which covers the bottom of the trough, box, or receptacle A and upon which rests the cyanid solution to be worked. This layer or body D of quicksilver bears upon the contact-plates D', connected with wire $D^2$ by branch wires $d$. The electric circuit is thus completed between wires C' and $D^2$ when the anodes are within the cyanid solution, and the metal held in suspension within the solution is precipitated upon the body of quicksilver forming the cathode.

I employ a body of quicksilver as a cathode in contradistinction to an amalgamating-plate. In case an amalgamating-plate should be utilized it would be required that said plate be stripped after treatment of the solution besides liability of the gold flaking. By the use of a liquid body of quicksilver the gold is precipitated and taken from the apparatus in the form of amalgam. This distinction is now made for the purpose of pointing out that by the expression "body of quicksilver" as used in the claims is not meant an amalgamating-plate.

The quantity of solution to be treated by any given machine is determined by the area of the electrodes, the value of gold per ton contained in the solution being first ascertained, it being well known that one ampere will deposit a certain amount of gold in a given time.

The quicksilver when it has become too rich in gold may be drawn off through the outlet-opening $d'$ in one corner of the machine in the form of amalgam. This amalgam is treated in any well-known manner in order to separate the precipitated metal therefrom.

Having thus described the invention, what is claimed as new, and desired to be protected by Letters Patent, is—

1. An apparatus for recovering precious metals from flowing cyanid solutions, comprising in combination a relatively long substantially horizontal trough, means for supplying the solution at one end thereof, a partition near the receiving end of the trough for distributing the solution, a retaining-partition at the discharge end of the trough adapted to retain the solution in the trough to the desired height, a body of quicksilver in the bottom of the trough between said partitions, a series of anodes supported above said body of quicksilver, in the path of the flowing solution, and suitable electric connections with said anodes and said quicksilver substantially as described.

2. An apparatus for recovering precious metals from flowing cyanid solutions, comprising in combination a relatively long substantially horizontal trough, means for supplying the solution at one end thereof, a partition near the receiving end of the trough for distributing the solution, a retaining-partition at the discharge end of the trough adapted to retain the solution in the trough to the desired height, a body of quicksilver in the bottom of the trough between said partitions, a series of transverse anode-supports extending substantially from partition to partition, a series of anodes adjustably mounted in said supports and extending down into the path of the flowing solution, and suitable electric connections, substantially as described.

In witness whereof I have hereunto set my hand.

CHARLES P. STEWART.

Witnesses:
N. A. ACKER,
D. B. RICHARDS.